United States Patent [19]

Cohen et al.

[11] Patent Number: 5,044,322
[45] Date of Patent: Sep. 3, 1991

[54] STRAP DEVICE

[75] Inventors: David S. Cohen, Beverly; Melvin I. Loman, Peabody, both of Mass.

[73] Assignee: Halemar Specialties, Inc., Peabody, Mass.

[21] Appl. No.: 548,565

[22] Filed: Jul. 5, 1990

Related U.S. Application Data

[63] Continuation-in-part of Ser. 416, 589 Oct. 3, 1989.
[51] Int. Cl.$^5$ .................... A01K 27/00; A01K 25/00
[52] U.S. Cl. ......................................... 119/106; 119/133
[58] Field of Search ............... 119/106, 129, 130, 131, 119/132, 133; 54/80

[56] References Cited

U.S. PATENT DOCUMENTS

| 694,379 | 3/1902 | Hart | 119/106 X |
| 1,215,884 | 2/1917 | Smith et al. | 54/80 |
| 1,773,774 | 8/1930 | Carr | 119/133 |

FOREIGN PATENT DOCUMENTS

| 2414474 | 9/1979 | France | 119/106 |
| 8105388 | 6/1983 | Netherlands | 119/106 |

Primary Examiner—Robert P. Swiatek
Attorney, Agent, or Firm—Paul J. Cook

[57] ABSTRACT

A strap device adapted to be secured to an animal is provided which has a strap with at least one end portion adapted to be formed into a loop which is closed with a fastener comprising a boss or rivet having exposed smooth surfaces. The section of the strap device adjacent the strap end after forming the loop is thicker than the remaining section of the strap and has a top surface which inclines from a height substantially equal to the strap end portion down to the section of the stap having a thinner thickness. The fastener is designed to fit tightly within two holes in the strap so the loop can not be removed by hand.

6 Claims, 4 Drawing Sheets

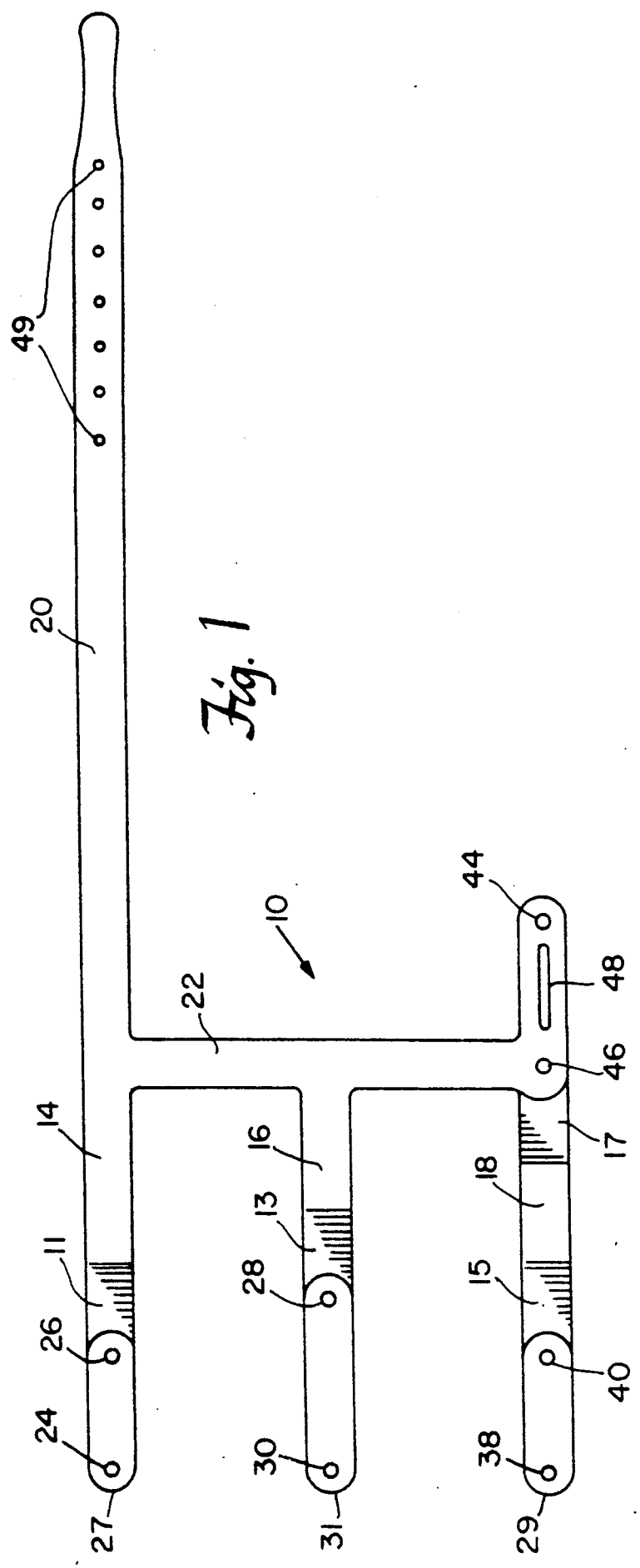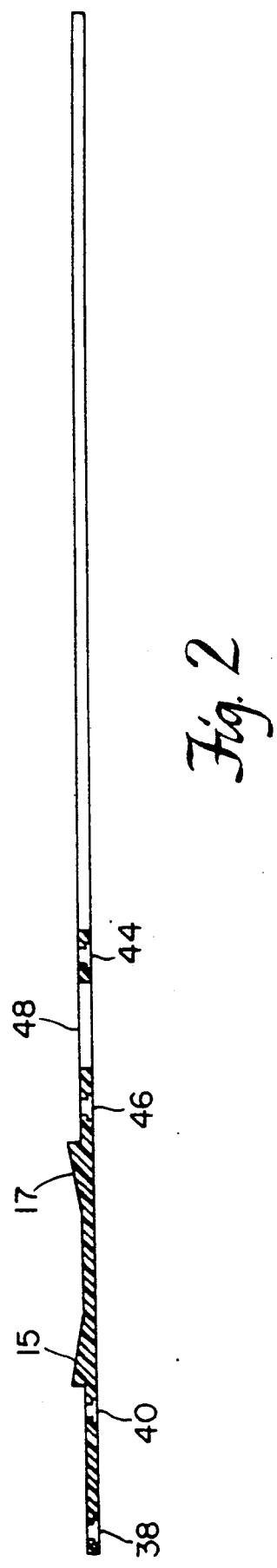

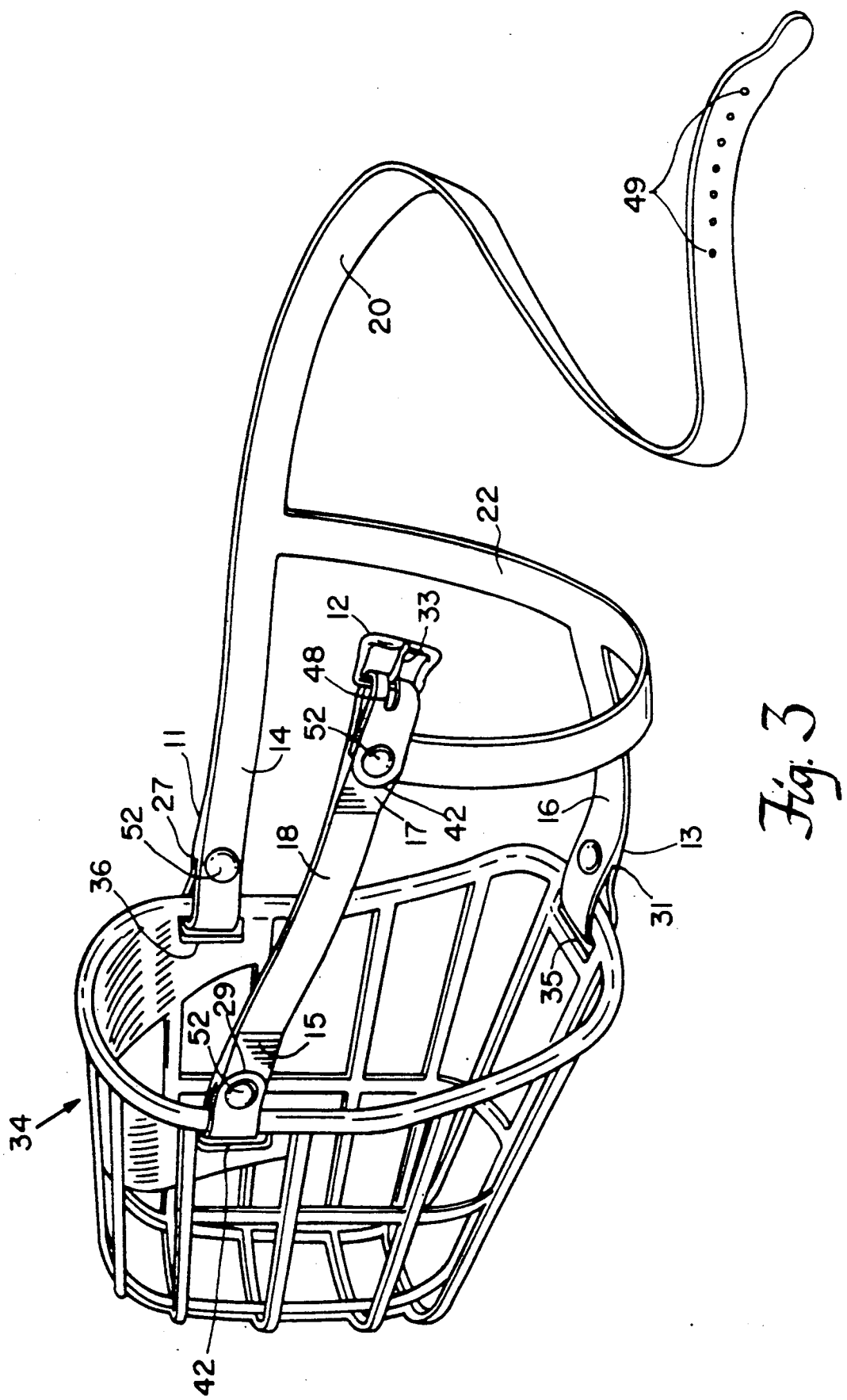

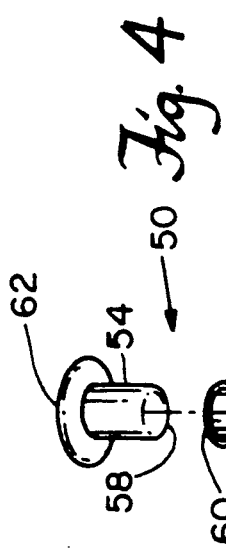
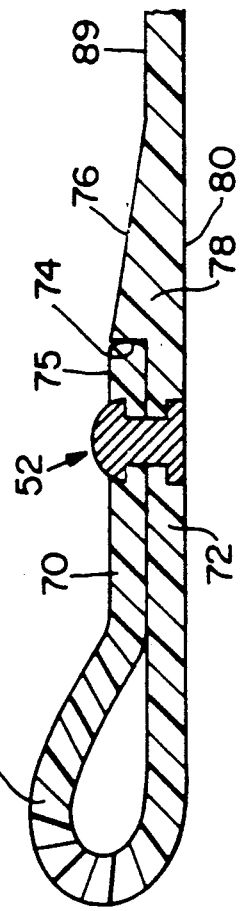
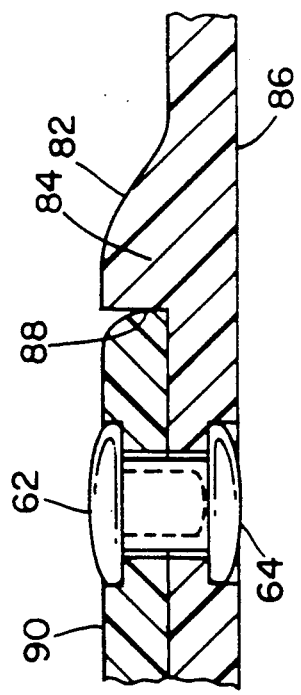
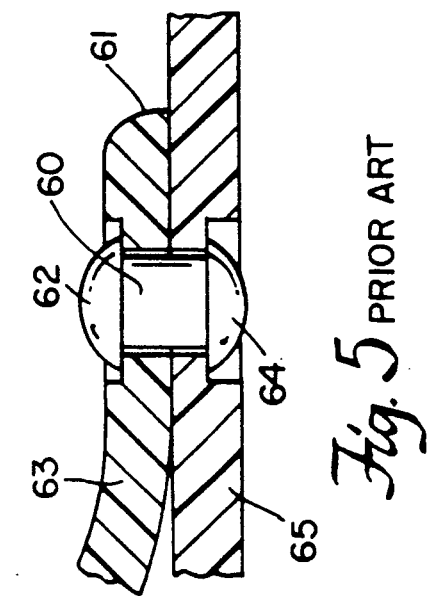

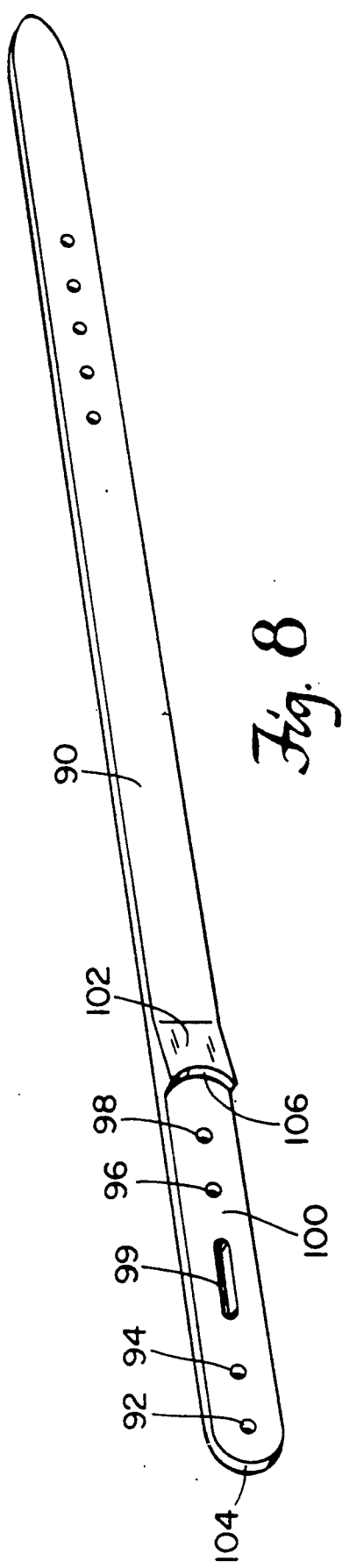

STRAP DEVICE

REFERENCE TO RELATED APPLICATION

This application is a continuation in part of copending application Ser. No. 416,589, filed Oct. 3, 1989, and now abandoned.

BACKGROUND OF THE INVENTION

This invention relates to a novel permanent fastening means particularly useful for fastening straps such as animal collars and headstalls.

At the present time, muzzles or kennel baskets for animals are secured over the snout of the animal by means of a strap-like device which secures the muzzle or kennel basket snugly to the animal snout. The strap-like means is attached to the muzzle, is positioned about the back of the animal's head and is secured by means of a buckle. The purpose of the muzzle or kennel basket is to prevent the animal from chewing or eating materials which would be harmful to the animal. The headstall is made from four separate pieces such as leather or a reinforced polymeric material. Presently, the strap pieces are secured together and secured to the muzzle or kennel basket by means of rivets having exposed discontinuous surfaces with sharp edges. The use of rivets having sharp edges is undesirable since they can scratch or tear the animal, they are prone to rusting and can be detached under the forces exerted by the animal such as by rubbing the headstall and muzzle against a cage within which the animal is housed. In addition, the rivets must be positioned a distance of about one half inch or more from the end of the strap pieces so that the strap pieces are not prone to be ripped along that portion between the rivet and the end of the strap piece. The necessity of having such a long end portion of the strap when utilizing rivets is undesirable since the animal can easily position the end of the strap against the walls of the cage thereby to gain leverage against the point where the rivet is attached and cause the rivet to become detached or the strap to begin ripping at the rivet. Alternative means such as heat activated adhesives, heat sealing by radio frequency and pressure sensitive adhesives have been attempted as means for joining the strap piece ends to form the headstall. All such joining means have been found to be inadequate for use for even short periods of time on an animal. In addition, the use of multiple strap pieces necessitates nonuniform surfaces in the final product in the areas where the pieces overlap and are joined. These overlapping areas are undesirable since they cause abrasion to the animal wearing the device.

It has been proposed to provide a strap such as a watch band which is molded as one piece, including a buckle portion and an opposite end of the strap having holes which fit over bosses molded within the strap. However, such arrangements are designed so that they can be easily removed such as with the finger of a wearer to pry the exposed end of the strap from the boss when it is desired to remove the article to which the strap is attached.

It would be desirable to provide a means for securing a strap or a collar which permits permanent attachment even under conditions of use with an animal while avoiding an exposed end of the strap which can be subjected to leverage forces.

SUMMARY OF THE INVENTION

The present invention provides a one piece strap-like device such as a collar or headstall construction having ends with holes through which a fastener having exposed smooth continuous surfaces is positioned as a means for attachment to a device such as a muzzle or a buckle or the like. The fasteners and mating holes are at each end of the strap-like device whereby they can be formed into a loop. The free end of the loop abuts a thick portion of the strap device having an inclined top surface which prevents application of force to the free end of the strap device. Since force cannot be applied to the free end of the strap device, it cannot be pried free of the fastener by an animal wearing the strap device. In addition, the absence of an exposed strap end and rivets having a discontinuous surface eliminates the possibility of abrasion to the animal wearing the strap-like device.

BRIEF DESCRIPTION OF THE DRAWINGS

FIG. 1 is a top view of a headstall construction of this invention.

FIG. 2 is a side view and partial cross-section of the headstall construction of FIG. 1.

FIG. 3 shows the headstall of this invention positioned on a kennel basket.

FIG. 4 is an exploded view of a rivet construction useful in the present invention.

FIG. 5 is a close-up view of the strap-like device of the prior art.

FIG. 6 is a cross-sectional view of the strap-like device of this invention.

FIG. 7 shows an alternative cross-sectional design of the strap-like device of this invention.

FIG. 8 is a 45° view of a collar of this invention.

DESCRIPTION OF SPECIFIC EMBODIMENTS

Referring to FIGS. 1, 2 and 3, the headstall of this invention 10 is formed of a flexible, strong strap-like device such as polyurethane, a buckle 12 (FIG. 3) and fasteners 52 or rivets 50 (FIG. 4) having a smooth continuous surface. The strap-like device comprises three auxiliary straps 14, 16 and 18, a headstrap 20 and a connecting strap 22. Strap 14 includes a hole 24 and a hole 26 both of which mate with a fastener 52 (FIG. 6) or rivet 50 (FIG. 4). Strap 16 includes a hole 28, and a hole 30. The hole 30 is utilized in conjunction with hole 28 on strap 16 in order to position the muzzle 34 on the animal's snout. Inclined surfaces 11, 13, 15 and 17 are formed integrally with the headstall by increasing the thickness of the headstall where the inclined surfaces are desired as will be more fully described below with reference to FIGS. 6 and 7. As best shown in FIG. 3, strap 14 fits about hole 36 so that holes 24 and 26 of strap 14 are positioned on fastener 52 while strap end 27 abuts inclined surface 11 to prevent exposure of end 27. Headstrap 20 is provided with holes 49 which fit into the tongue 33 of buckle 12. The strap 18 includes a hole 38 and a hole 40 and is positioned on muzzle 34 so that holes 38 and 40 fit about boss 52 while the strap 18 extends through hole 42. Strap end 29 abuts inclined surface 15 to prevent exposure of end 29. Strap 18 also is provided with a boss 52 and holes 44 and 46 so that a buckle 12 can be fit into hole 48 and secured thereto by passing a boss (52) through holes 44 and 46. Strap end 31 of strap 16 abuts inclined surface 13 to prevent exposure of end 31 while strap 16 extends through hole 35.

A fastener having continuous smooth exposed surfaces useful in the present invention is shown in FIG. 4. As shown in FIG. 4, a two piece rivet 50 comprises a male section 54 and a female section 56. The male section 54 has a rounded bottom surface 58 which fits into hollow cylinder 60. When the sections 54 and 56 are forced together, the bottom surface 58 expands within the cylinder 60 so that the sections 54 and 56 are retained together under frictional forces. The rivet 50 has exposed smooth continuous surfaces 62 and 64 rather than discontinuous surfaces with sharp edges. As shown in FIG. 5, the end 61 of strap 63 is exposed and a force against surface 61 in the prior art device will tend to separate the strap 63 from the strap section 65.

In contrast to the prior art device shown in FIG. 5, the apparatus of this invention includes a section thicker formed integrally with the strap which forms a smooth essentially continuous surface with the top surface at the exposed end of the strap. The thicker section of the strap can have a surface which is flat or inclined so long as that surface is smooth and that it forms a smooth essentially continuous surface with the top surface at the end of the strap. As shown in FIG. 6, a one-piece boss 52 is utilized to form a loop 68 from strap portions 70 and 72. The end 74 abuts inclined surface 76 formed of a thicker section 78 of strap section 80 so as to prevent exposure of end surface 74. The inclined surface can be planar, slightly concave or slightly convex so that any source of a force such as a fence, cage or the like will slide along the inclined surface 76, top surface 75 adjacent the end 74 and out of contact with end 74. As shown in FIG. 7, the inclined surface 82 is slightly convex. The surface 88 is formed from a slightly thicker section 84 of strap section 86. The section 84 protects end 88 of strap section 90. The rivet of FIG. 4 can be utilized rather than the boss of FIG. 6 since both the rivet 50 and the boss 52 have smooth continuous exposed surfaces.

The present invention is not limited to a headstall construction but can be utilized for any strap-like device such as a collar. As shown in FIG. 8, the collar (minus the buckle) is formed from a one-piece strap 90 having two holes 92 and 94 which mate respectively with holes 96 and 98 respectively when utilizing fastener 50 (not shown) in the manner and with the design set forth above. A conventional buckle can be provided to be inserted in slot 99 and a D-shaped ring can be inserted in space 100 when the holes 92 and 94 are mated with the holes 96 and 98 respectively. The D-shaped ring is utilized to attach a leash by a handle. The collar 90 is provided with a thicker section 102 so that collar end 104 mates with end 106 of the section 102 in the manner set forth above.

We claim:

1. A strap device adapted to be secured to an animal which comprises a strap having at least one strap end portion adapted to be formed into a loop by positioning two holes in said at least one end portion having an end surface and a top surface over a fastener, said fastener having exposed continuous surfaces, a strap section adjacent said end surface of said at least one end portion, said strap section having a second top inclined surface and having a thickness greater than the thickness of said at least one end portion, said top surface and said second top inclined surface forming an essentially continuous third smooth top surface.

2. The strap device of claim 1 having the shape in the form of a headstall, said headstall having a plurality of end portions, means for attaching a buckle to one of said end portions comprising (a) a buckle slot, (b) said fastener, (c) two holes which fit over a boss and (d) a strap end having a plurality of holes which fit with said buckle.

3. The strap device of claim 1 having a shape in the form of a collar and means for attaching a buckle to an end portion of said strap comprising (a) a buckle slot, (b) said fastener, (c) two holes which fit over said fastener and (d) a second end portion having a plurality of holes which fit with said buckle.

4. The strap device of claim 1 having the shape in the form of a headstall, said headstall having a plurality of end portions, means for attaching a buckle to one of said end portions comprising (a) a buckle slot, (b) said fastener, (c) two holes which fit over a boss and (d) a strap end having a plurality of holes which fit said buckle.

5. The strap device of claim 1 having a shape in the form of a collar and means for attaching a buckle to an end portion of said strap comprising (a) a buckle slot, (b) said fastener, (c) two holes which fit over said fastener and (d) a second end portion having a plurality of holes which fit with said buckle.

6. A strap device adapted to be secured to an animal which comprises a strap having at least one strap end portion adapted to be formed into a loop by positioning two holes in said at least one end portion having an end surface and a top surface over a fastener, said fastener having exposed continuous surfaces, a strap section adjacent said end surface of said at least one end portion, said strap section having a second top inclined and flat surface and having a thickness greater than the thickness of said at least one end portion, said top surface and said second top inclined and flat surface forming an essentially continuous third smooth top surface.

* * * * *